B. F. Dunning,
Hay Press.
No. 46,785.     Patented Mar. 14, 1865.
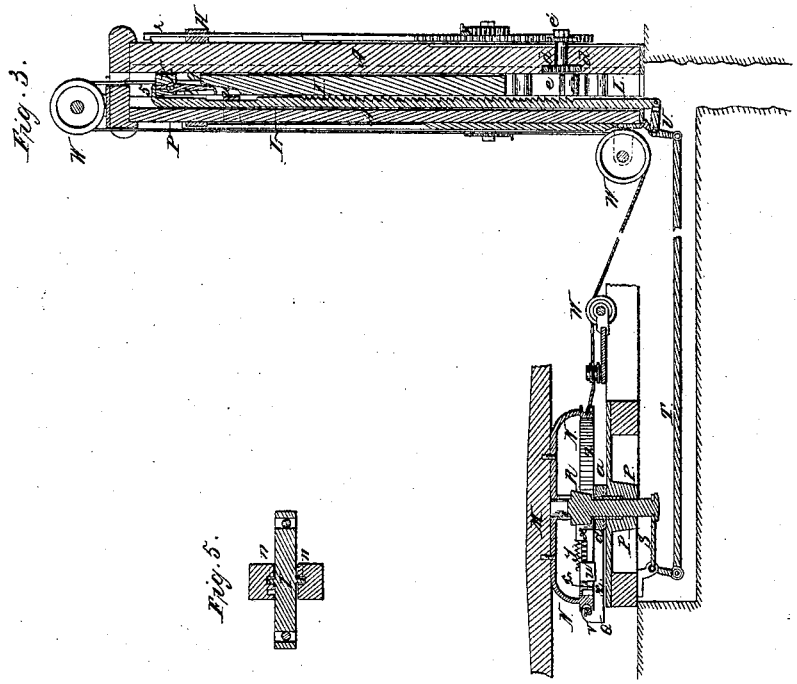
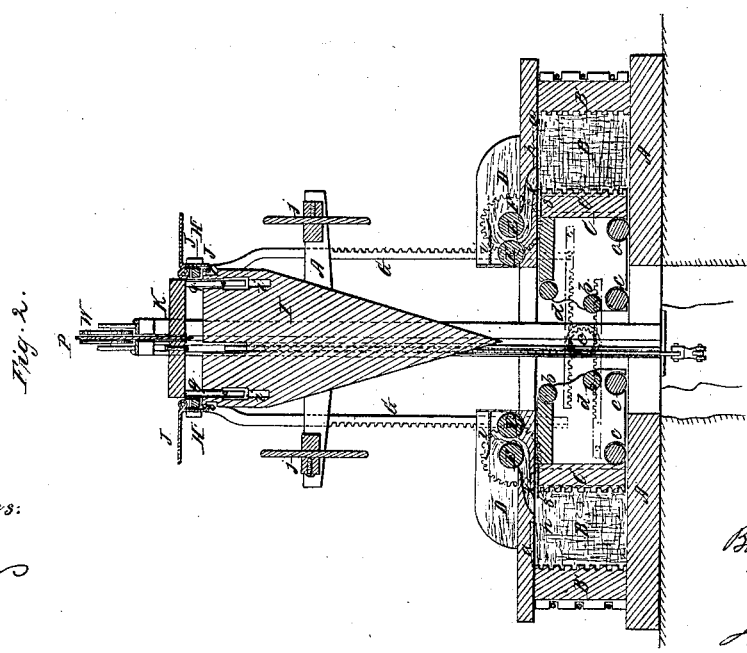
Witnesses:
J. B. Clayton
John Mulvany
Inventor:
Benj. F. Dunning
by Atty
J. C. Clayton

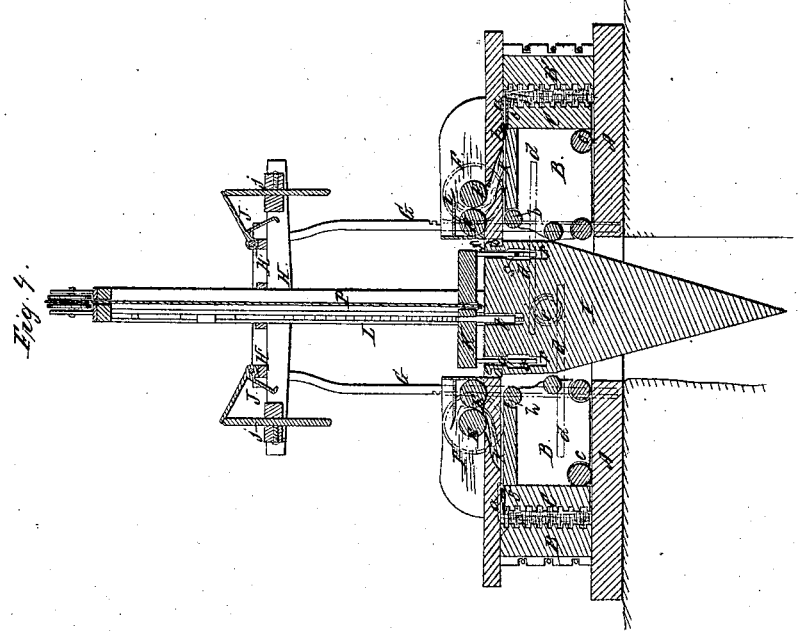
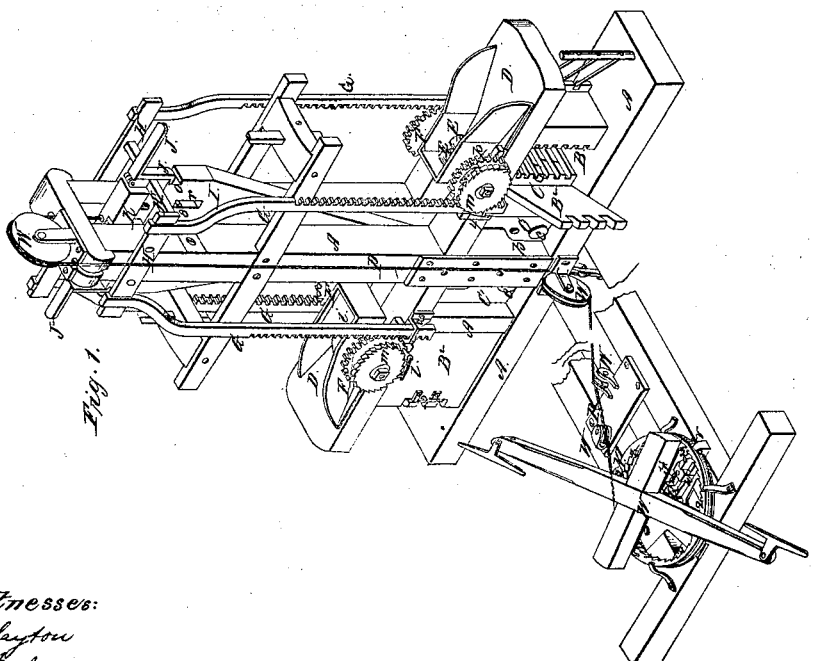

UNITED STATES PATENT OFFICE.

BENJN. F. DUNNING, OF GALESBURG, ILLINOIS.

IMPROVEMENT IN HAY AND COTTON PRESSES.

Specification forming part of Letters Patent No. 46,785, dated March 14, 1865.

*To all whom it may concern:*

Be it known that I, BENJAMIN F. DUNNING, of Galesburg, Knox county, in the State of Illinois, have invented certain new and useful Improvements in Hay and Cotton Presses, to be known and used as the "American Telegraph Hay and Cotton Packer;" and I do hereby declare that the following is a full and exact description thereof, reference being had to the accompanying drawings, and to the letters of reference thereon marked, similar characters in the several figures referring to like parts.

The accompanying drawings consist of Plates I and II.

Figure 1 is a general view of the machine in perspective, the wedge being raised and just about to be disengaged and fall. Fig. 2 is a longitudinal vertical section of the machine in the same position through the wedge and press-boxes. Fig. 3 is a transverse vertical section of the machine in the same position, and fully illustrates the mode of raising and disengaging the wedge. Fig. 4 is a longitudinal vertical section through the wedge and press-boxes, and shows the position of the machinery after the wedge has fallen. Fig. 5 is a cross-section through the wedge.

To enable others to make and use my invention, I will describe its construction and operation.

The nature of my invention consists, principally, in deriving the power used for the purpose of pressing with great force hay, cotton, wool, &c., from the falling of a heavy wedge between a suitable pair of followers provided with friction-rollers and working in hay or cotton press boxes, as will more fully hereinafter appear; also, in pressing the hay or cotton, &c., in successive sheets until the bale is completed, instead of applying the pressure to the whole bulk of the material; also, in so constructing the arrangement for raising the wedge as to avoid the necessity of any reversing or stopping, in order to take up the "slack rope;" also, in the construction of the mechanism by which the wedge is raised and then disengaged; also, in the construction of the feed arrangement, by which the hay or cotton is partially compressed, and then fed in sheets of certain required dimensions into the press-boxes, so that sufficient material for one sheet receives through the follower the pressure of the fallen wedge, and as the wedge rises and falls for another stroke another sheet is fed into the press-box in time for the second stroke, and so on until the desired number of sheets needed to form a "bale" are packed; also, in certain other minor points, all of which will fully hereinafter appear.

In the drawings, A represents the framework of the machine, and is made wholly out of heavy square timber, and is readily constructed by any ordinary mechanic.

B B are the two press-boxes in which the bales are pressed, the internal dimensions of each box being equal to the desired size of the bale.

B' B' are the end posts which form the outer sides of each box. The inner face of these posts is equal in width and height to the width and height of a bale, and is provided with slots 1 1, between which the baling-ropes are passed after the bale is packed. These posts are hewed out of short posts twenty-one inches square, (the usual width of a hay bale,) and are mortised into those parts of the frame A which serve as top and bottom of the press-boxes. These end posts are made thus heavy because they must resist the immense power of the falling wedge.

*a a* are relief-battens, Figs. 2 and 4, secured to the under side of the top of the press-boxes at a slight angle, so that the height of the bale at the end posts is somewhat less than the height at the follower. The effect of this construction is that after the bale has been pressed and tied a bar can be inserted between the bale and the end post, and the top of the bale be pushed toward the follower, which has been a little withdrawn. The bale can then be pushed out sidewise.

$B^2$ is the side gates of the press-boxes.

C C represent the two followers, which operate as pistons in the press-boxes. They are provided with slats like those of the end posts, and are made of heavy solid timber, their height and width being respectively equal to the height and width of the bale. The followers (see Figs. 2 and 4) rest upon two metallic rollers, *c c*, which roll upon the foundation-beam. *b b* are friction-rollers at the rear of each of the followers, having their boxes in the metallic side plates, C' C', of the followers. Each pair of these rollers is so arranged as to be in contact with the contiguous side of the wedge as it falls between them. Each follower is provided with a rack, $d$, working upon the top and bottom of a pinion, $e$, for the purpose of withdrawing the followers and bringing them together after each stroke of the wedge.

$e'$ is another pinion on the same shaft, and is operated by means of the rack-bar $f$, the raising or depressing of which operates the followers. Rack-bar $f$ is provided with a stud, 2, against which the rack-frame (soon to be described) operates, so as to raise the same.

$g\ g$ are steel knives placed upon the upper edge of the followers, and cut against the steels $h\ h$, for the purpose of cutting off the material for each sheet as each stroke is made.

D D are the feed-boxes, which are formed upon the frame immediately over each press-box B.

E E are the feed-rollers, arranged in pairs, the circumference of each roller being equal to the height of the bales.

$i\ i$ are swallow-tail knives, one over and about three inches above each pair of rollers, and serve to trim off the material to be packed, and to admit a sheet of given thickness (say three inches) to the rollers, between which it is somewhat compressed, and then fed downward, end foremost, through opening $k$ into the hay-box B, just in front of the follower C. Each of the four feed-rollers E is provided with a pinion, F', and each of these pinions is provided with and operated by a rack-bar, G, the lower end of each of these rack-bars being guided by staples 4 4, while the upper ends are secured to and steadied by the rack-bar frame H. The pinions F are not keyed upon their shafts, but are provided with pawls $l$ and ratchets $m$, so arranged that the descending motion of the rack-bars G shall make the rollers E turn in the direction necessary to feed, while their ascending motion shall merely turn the pinions F loosely upon their shafts.

H' H' are the cross-bars of the rack-frame H.

I is the wedge, which is composed of solid wood, and may be some fourteen feet high, six feet wide, and one foot thick, and weigh about a ton; or its dimensions may vary to suit the builder or the purpose for which the machine is to be used. When the wedge is raised to its greatest height, it is intended that its top shall be some twenty-eight or thirty feet from the ground, and that it shall fall into a pit immediately beneath it, and some six feet deep.

Fig. 5 represents a cross-section of the wedge, and the uprights of the frame, which are provided with suitable guiding-grooves, in which the tongues $n$ of the wedge slide, so as to make it keep its proper position. $o\ o$ are notches cut into each upper corner of the wedge, and into which the triggers J J catch as the wedge strikes up against them as it rises. K is the wedge-cap, and is a heavy piece of square timber as thick as the wedge, but in length a little less than the width of the wedge. The cord P, which elevates the wedge, is secured to the cap K. $q\ q$ are suitable strong bolts secured to the cap, and working up and down in holes $r$ in the top of the wedge, and are provided with pins $s\ s$, which prevent the withdrawal of the rods $q$. $t$ is a hanging dog pivoted to the under side of the cap K, and rises and falls with the cap, and sheathes itself in the inclined groove in the top edge of the groove. As the cap K falls it carries with it the dog $t$, which catches and pushes downward the ratchet-lever L. 5 is an arm on the upper end of the ratchet-lever.

I will now describe the device for elevating and dropping the wedge.

W is the rope-pulleys; M, the operating-lever of the horse-power, and which is firmly secured to the top of the metallic rope-wheel N, which is provided with a series of ratchet-teeth, $z$, upon its internal periphery, and is provided with a hollow shaft, O, which revolves in the journal-box P.

Q is the swivel-lever, revolving around the shaft O. Its outer end has an eye, $v$, for fastening to the rope $p$, and it revolves in the rope-groove of the wheel N.

$w$ is a guide-staple upon the upper side of the lever Q, between its shaft O and the ratchet-teeth $z$.

$x$ is a dog, which slides into the staple $w$, and is intended to take into the ratchet-teeth.

$y$ is a small spiral spring, which is attached to the guide $w$, and operates against the dog, so as to release it from the ratchet-teeth.

R is a conical thimble rising up and down in the hollow shaft O, and operating against the dog $x$, so that when the thimble is depressed the dog shall be engaged with the wheel-ratchets, and when the thimble is elevated the dog shall be disengaged. The thimble is operated by means of a clutch, S, and levers T, U, and L.

The operation of my invention is as follows: The machine being put in working order and position, the doors of the hay-boxes are closed, and one hand is stationed at each feed-box, while one (or more) attends to the horses. When the machine is at rest, as shown in Fig. 4, the dog $t$ presses down upon the ratchet-lever L, which transmits motion through the levers S, T, and U to the thimble R, so as to depress the thimble, which thereby makes the dog $x$ of the swivel-lever Q catch into the ratchets $z$ of the rope-wheel N, thereby making the lever Q revolve simultaneously with and as a part of wheel N. In this position the horses are started and the rope is wound around the wheel N. As the rope continues to be wound, it first raises the cap K, to which its other end is attached. After this is raised a few inches its rods $q\ q$ and pins $s\ s$ make it lift with it the wedge I. As the wedge rises its upper corners strike against the under side of the cross-bars H', and thus the wedge raises with itself the rack-frame H and rack-bars G to the desired elevation. As the rack-frame H rises it strikes under the projection 2 of the rack-bar $f$, thus raising it up, as shown in Fig. 3, and thereby operates pinions $e'$ and $e$, so as to give motion to racks $d$, and thereby draw the two followers C together, ready to receive the stroke of the wedge. As the wedge strikes the cross-bars H', the triggers J J catch into the notches $o\ o$ of the wedge, so that the weight of the wedge shall serve to pull down the rack-frame, to which the triggers are secured. At the instant that the wedge is raised to its greatest height its cap K strikes under the arm 5 of the ratchet-lever L, thereby raising that lever and causing it, through levers U, T, and S, to elevate the thimble R. Thimble R being elevated, the spring $y$ releases the dog $x$, so that the lever Q is no longer fast to the rope-wheel N. At the instant that the dog $x$ is disengaged the whole weight of the wedge comes upon the unfastened eye end of the swivel-lever Q, which rapidly revolves around the wheel N (then stationary, the horses being stopped) until the rope is unwound and the wedge has stopped. As soon as the wedge stops, the cap K and its dog $t$ operate as before described, and fasten the swivel-lever Q to the wheel N, and the horses can then immediately start and raise the wedge without having to take up any slack rope. As the wedge falls it carries with it for the distance equal to the height of a bale the rack-frame H and rack-bars G, causing the rack-bars to turn their pinions F, so as to give one revolution to the feed-rollers E. Motion thus being applied to the feed-rollers, they carry forward the hay or cotton under the knives $i\ i$, (which trim it off even and square,) and partially compress it and feed it down through openings $k$ into the press-boxes B. When the rack-bars have been carried downward the desired distance, the triggers J J strike against the tripping-posts $j\ j$, thus detaching the wedge from the rack-frame and allowing it to fall clear down. It must here be understood that so little power is needed to carry down the rack-frame and disengage the triggers that the momentum of the wedge is not lessened at all. As the wedge continues its fall it strikes with amazing force against the friction-rollers $b\ b$ and between the followers C C, which are thus powerfully separated and driven up in their respective boxes against the sheet (or sheets) of hay or cotton fed down, as above described, thus thoroughly compressing the hay or cotton, so as to press two bales at once. This process will be repeated as often as necessary. It will here be borne in mind that the material to be pressed is fed into the boxes sheet by sheet, so that the power is applied to one thin sheet. The wedge is then raised, and, partially falling, carries with it the rack-bars which feed in a second sheet of material. The fall of the wedge a second time between the followers then presses this sheet up against the first sheet. It is expected that each bale will be composed of about twenty sheets, and will require twenty blows to pack it. By thus applying the pressure to a thin sheet of material at a time I am enabled to press with a greater degree of power than if I pressed the whole bulk of a bale at once. The hay is fed into the box in sheets of a height just about equal to the height of the box. As the followers press the sheets they add somewhat to their height, so that the upper and lower edges of each successive sheet is tucked under, thus giving a finish to the appearance of the bale. The bale being pressed, cords are passed between slats 1 1, and it is tied up. The horses are started for a few steps, so as to relieve the followers from the weight of the wedge and allow them to relieve the bale. The side gates are then opened, a bar is used to force the top of the bale toward the follower, when a push with the foot upon the side of the bale will throw it out.

By my invention I am enabled to construct for a less price a machine that will press an equal quantity in smaller and more compact bales in less time than can be done with any other invention of the kind.

My machine is at once simple, easy and cheap in construction, and singularly powerful and effective in operation.

Having thus fully described my invention, what I claim as new, and desire to secure by Letters Patent, is—

1. The wedge I, falling between followers C C, substantially in the manner and for the purposes specified.

2. Applying the pressure to the hay, &c., in successive sheets, when the sheets are fed in automatically by means of a falling weight or its equivalent, substantially as specified.

3. The combination and arrangement of wheel N, swivel-lever Q, dog $x$, thimble R, and shaft O, substantially in the manner and for the purposes described.

4. The combination and arrangement of cap K, dog $t$, ratchet-lever L, and levers S, T, and U, substantially in the manner and for the purposes specified.

5. The feed-rollers E and knives $i\ i$, constructed, arranged, and operating substantially in the manner and for the purposes specified.

6. The triggers J J, when so constructed and arranged as to release the wedge so soon as it shall have given one revolution to the feed-rollers, substantially in the manner and for the purposes specified.

In testimony that I claim the above I have hereunto set my hand.

B. F. DUNNING.

In presence of—
JOHN MATHYS,
JO CLAYTON.